United States Patent [19]
Duncan, Jr.

[11] Patent Number: 5,173,052
[45] Date of Patent: Dec. 22, 1992

[54] FIRE SAFETY TRAINING TRAILER FOR CHILDREN

[75] Inventor: Eugene H. Duncan, Jr., Lancaster, Pa.

[73] Assignee: Duncan Associates, Inc., Lancaster, Pa.

[21] Appl. No.: 760,933

[22] Filed: Sep. 17, 1991

[51] Int. Cl.⁵ .................... G09B 19/00; B60P 1/00
[52] U.S. Cl. .................... 434/226; 296/24.1; 296/168
[58] Field of Search ............ 434/226; D12/195; 280/789; 296/24.1, 16.8, 162

[56]  References Cited

U.S. PATENT DOCUMENTS

| | | | |
|---|---|---|---|
| 2,193,352 | 3/1940 | Thomas | 296/162 |
| 2,589,894 | 3/1952 | Ten Eyck | 296/24.1 |
| 4,526,548 | 7/1985 | Livingston | 434/226 |

FOREIGN PATENT DOCUMENTS

| | | | |
|---|---|---|---|
| 146465 | 6/1985 | European Pat. Off. | 434/226 |
| 2250736 | 4/1974 | Fed. Rep. of Germany | 296/168 |
| 1344265 | 10/1963 | France | 296/162 |
| 458591 | 7/1950 | Italy | 296/168 |
| 327568 | 4/1930 | United Kingdom | 296/168 |

*Primary Examiner*—Robert P. Swiatek
*Assistant Examiner*—L. Thomas
*Attorney, Agent, or Firm*—Martin Fruitman

[57]  ABSTRACT

A mobile fire safety training facility which simulates a residential structure and has reduced scale rooms and exterior for appeal to children. A two level structure mounted on a conventional flat bed trailer includes conventional house windows and doors for instruction on escape methods, a non-toxic smoke generator, operating smoke alarms and a functioning telephone system for instruction on emergency telephone use. The reduced overall height of the structure and a truss roof structure permit highway transportation, and an onboard control room with full view of the entire interior assures the safety of the children using the facility.

6 Claims, 3 Drawing Sheets

FIRE SAFETY TRAINING TRAILER FOR CHILDREN

SUMMARY OF THE INVENTION

This invention deals generally with education and instruction and more specifically with a mobile facility for instructing children in regard to fire safety in the home.

For one week every year, "Fire Safety Week", virtually every school student is exposed to fire safety information. Unfortunately, it is usually only "exposure", with very little instruction or experience to which the typical child can relate. The children draw posters, enter contests, and sometimes visit fire stations, but few children associate the information they receive with their own lives.

The danger to children from home fires is very real, and the difference between survival and death is often the difference between teaching a child what to do when there is a fire and doing nothing. Yet, there has been no facility available to teach children, particularly young children who learn best by experience rather than by lecture, what to do when fire breaks out. This lack of an instructional facility is most probably do to cost as much as anything else, because it is clearly very costly to build or dedicate a building for teaching children fire safety by simulating the problems of fire in the home.

This problem has been overcome by the present invention which provides a mobile facility, transportable on standard highways without special permit, which can be located at one site for a short time and then moved for instruction elsewhere.

The present invention is a representation of a typical residence, portions of which are two level, mounted on a standard flat bed semi-trailer and scaled down to a size which appeals to small children. The structure includes representations of a kitchen with applicances, a living room, stairs between the lower and the upper levels and two bedrooms. Even its exterior is realistically designed so that children immediately associate it with their own homes.

An important aspect of the structure is the use throughout of the same type of devices which are found in most homes, so that children can actually interact with the structure, as they must be prepared to do in their own homes in case of fire. Therefore, the windows are of standard residential construction, and operate in the same manner as do standard residential windows. In fact, two types of operating windows, vertical sliding sash type and windows with hinges with crank operators, are included in the preferred embodiment of the invention.

Similarly, although the height of each level of the two level portion of the structure is lower than a standard room, the stair risers are of standard height because children must cope with that condition in their own homes. Standard residential type doors are provided in both normal and reduced heights to enable children who may have difficulty in using standard door on their own to, nevertheless, experience the procedures of proper escape during a fire.

Many devices within the structure are specifically related to teaching fire safety procedures. Particularly, there are operating smoke detectors of both the household and public area types, a strobe light fire alarm, an alarm pull station, sprinkler heads, a smoke generator which produces non-toxic smoke, and an operating intercom with a telephone handset in the kitchen which is interconnected with a second telephone within the on-board control room. The structure also includes a structurally sound small balcony, which, along with all interior floors of the structure, is capable of supporting both adult and child occupants and from which upper story escape procedures can be demonstrated and practiced.

The control room is of a height comfortable for an adult operator, at least six feet high, and is located so that the operator can visually observe all areas of the structure. The operator can manually control the smoke generator, a ventilating system capable of flushing smoke from the structure, all the smoke detectors and fire alarms, and can answer the instructional telephone.

The telephone system is particularly valuable for instruction, because it can be activated on either 911, the almost universal emergency number, or any other seven digit number for areas which do not use the 911 system. Thus, children can actually practice the use of emergency telephone procedures, and the response they receive from the control room operator can, of course, simulate the actual response they would receive in their area to such emergency telephone calls. Clearly, the actual presence of smoke can be used to make the emergency telephone use ultimately realistic, and thereby make it more likely that a child will react properly under actual emergency conditions.

However, the major use for the smoke generator on board the structure is to teach escape procedures in a realistic environment. The standard procedure of staying close to the floor and crawling out of the building can be taught in the presence of smoke, and because of the two story structure, escape instruction can realistically include moving down stairs. The conventional operation of windows and doors, which can be used for escape instruction, adds to both the realism and the association of the instruction to the children's own homes.

Therefore, because of the unique size, structure and arrangement of the various devices within the structure of the invention, the present invention permits large numbers of children at multiple locations to receive highly pertinent instruction on the fire safety and the fire escape procedures which should be used in their own homes.

DETAILED DESCRIPTION OF THE PREFERRED EMBODIMENT

Figure 1:
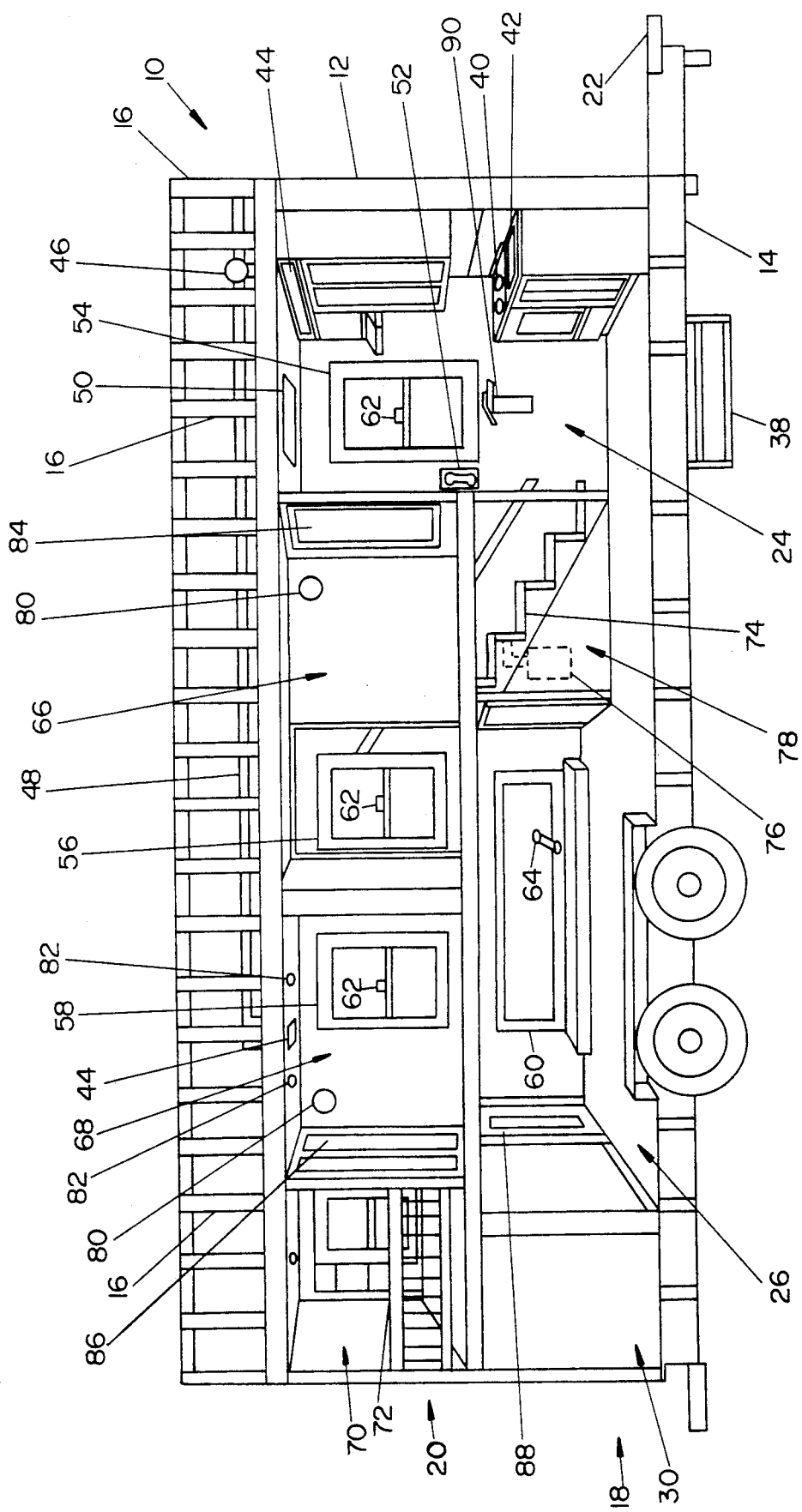
FIG. 1 is a modified side elevation view of the preferred embodiment of the invention, with the side wall removed to facilitate viewing the interior.

FIG. 1 is a side elevation view of the preferred embodiment of the invention with the nearest side wall removed to facilitate viewing the interior, in which fire safety trailer 10 includes enclosed structure 12 mounted upon conventional flat bed trailer 14. Enclosed structure 12 is constructed so that it resembles a typical residential home both inside and outside, except for the reduced scale of certain portions of structure 12.

Triangular truss structures 16 are included along the top of structure 12 to strengthen structure 12 to permit the entire safety trailer to travel at highway speeds with no damage to structure 12 from the shock, vibration and wind forces generated by such travel. The triangular configuration of the trusses also permits the exterior design of structure 12 to include a conventional sloped roof configuration which adds to the representation of the structure as conventional residential housing, so that children may better relate the structure to their own homes.

Figure 2:
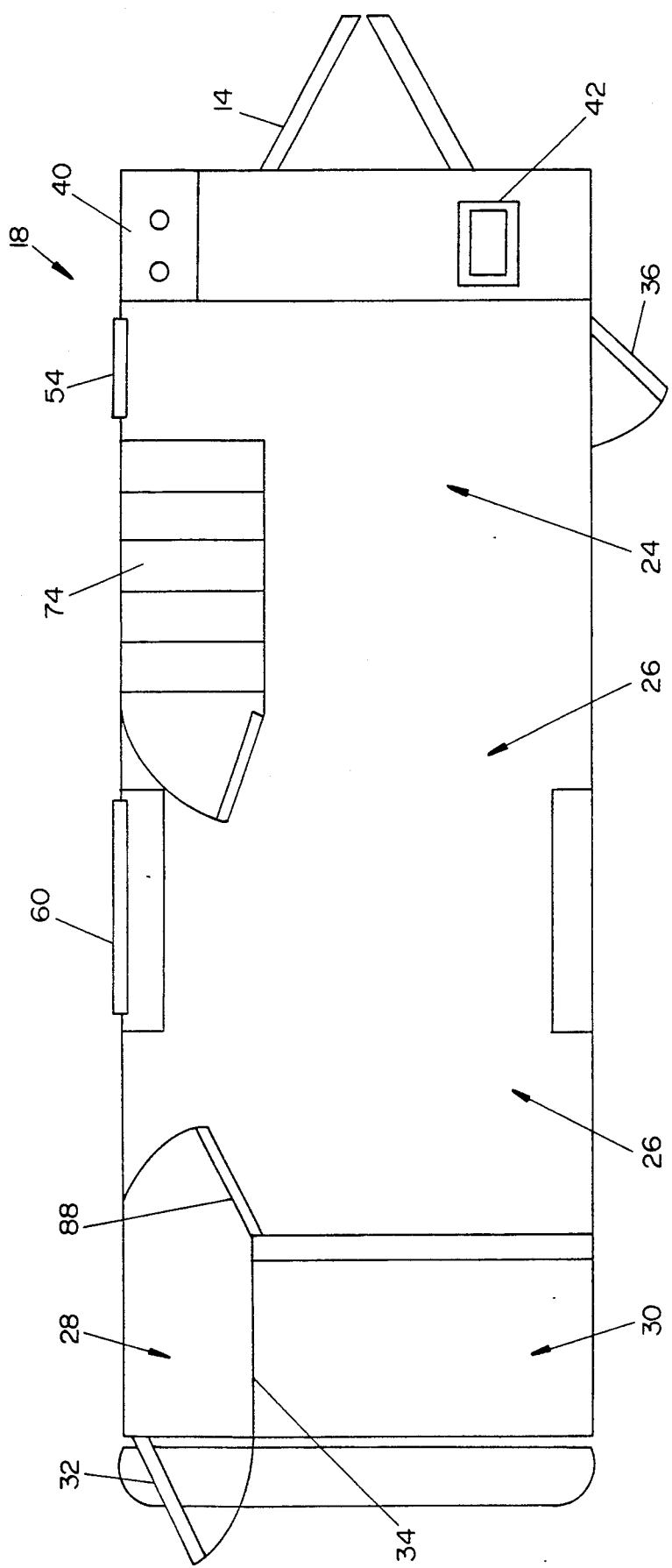
FIG. 2 is a schematic drawing of the floor plan of the lower level of the preferred embodiment of the invention.

Within structure 12 there are several rooms, arranged on two levels, 18 and 20, which continue the association of structure 12 to a typical home. Progressing from the front hitch 22 to the back of trailer 14 on lower level 18, as seen in FIG. 1 and in FIG. 2, which is a schematic floor plan of lower level 18, the rooms are kitchen 24, living room 26, control room 28 and storage area 30.

Control room 28, which is generally unavailable to the children being instructed within structure 12, is constructed with a full height of at least six feet for the comfort of the operator and has a rear door 32 for use as an independent entrance. Storage area 30, which is accessible to the operator at boundary 34, is, however, of the reduced height of slightly less than four feet. Living room 26 also has the reduced height, but kitchen 24 is of full height. The reduced height of storage area 30 and living room 26 permits upper level 20, also of reduced height, to be included on trailer 10 while maintaining the total height of trailer 10 at less than fourteen feet, thus permitting transportation of trailer 10 on highways without special permits.

The interior of trailer 10 is available to both children and instructors through full size door 36 (seen in FIG. 2) which is located above steps 38 (seen in FIG. 1), which lead into kitchen 24. Kitchen 24 includes several devices which children will immediately recognize, and which can be used for instruction. Stove 40 can be used to demostrate methods of extinguishing cooking fires, and sink 42 can be used to demonstrate the appropriate action, such as turning off water feed valves, for non-fire emergencies such as broken pipes. Ventilator 44 is one of several ventilators 44 within trailer 10 which operate to exhaust non-toxic smoke generated for instruction purposes. The ventilators are interconnected to exhaust fan 46 by duct 48 located within the truss area above the rooms. Ceiling light 50 furnishes illumination for night time instruction and adds to the realism of trailer 10.

One of themore valuable teaching aids within trailer 10 is intercom telephone 52. Telephone 52, although interconnected only to a unit within control room 28, is arranged to realistically be responsive when the number dialed or entered is the appropriate emergency telephone number for the minicipality within which the instruction is taking place. Thus, either 911 or any other seven digit number can be used as the appropriate number to activate telephone 52. This permits children to actually perform the necessary steps to reach emergency assistance, while the control room operator responds in the same manner as emergency personnel would.

Windows 54, 56, 58 and 60 are also valuable teaching aids. They are actually conventional house windows, except for the use of safety glass, and operate in the same manner as the windows likely to be found in children's homes. Windows 54, 56 and 58 are conventional vertical opening windows and can include locks 62, while window 60 is an awning type window operated by crank 64. The similarity of these windows to those in typical homes permits instruction on opening household windows for escape purposes.

Figure 3:
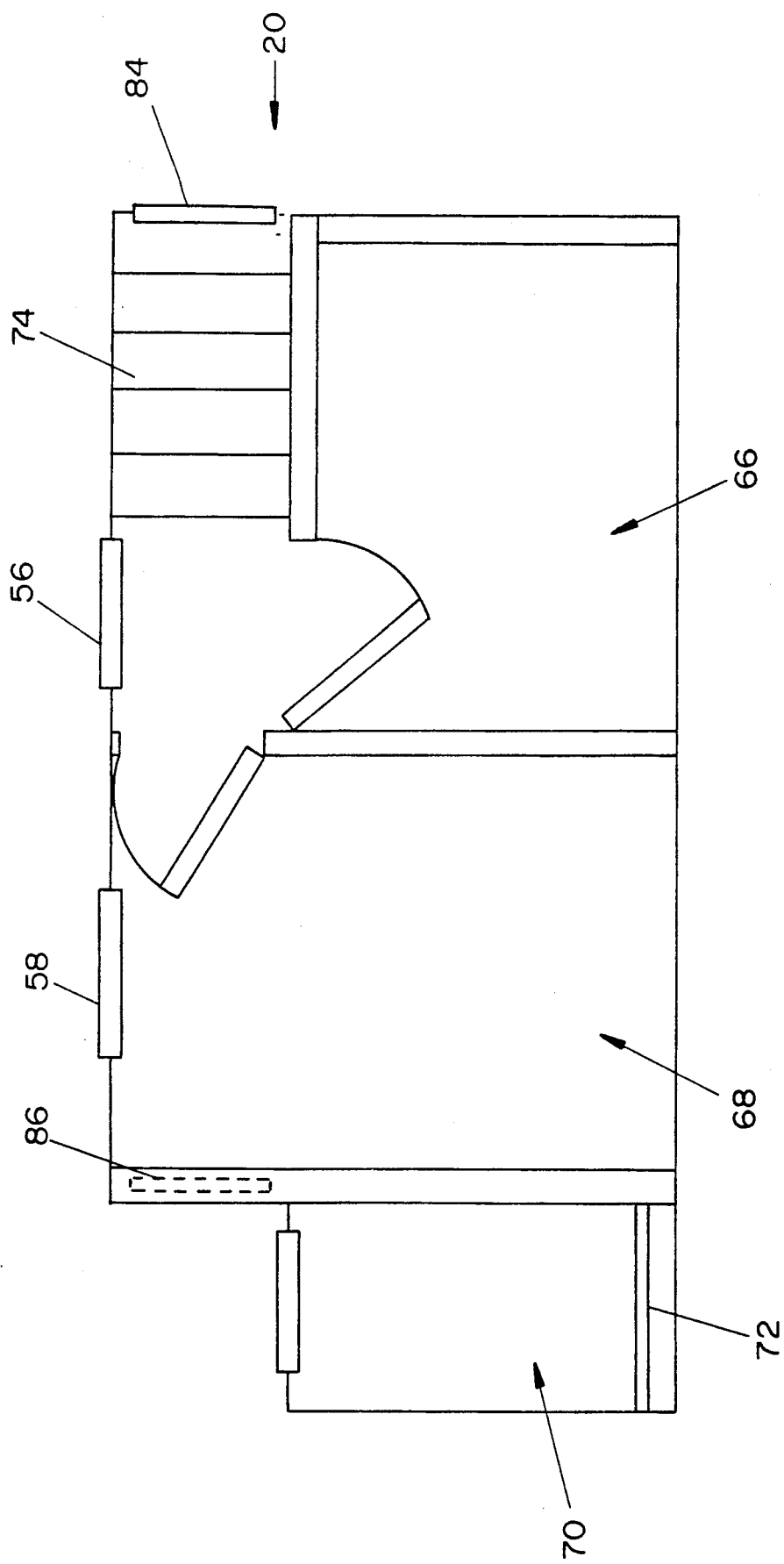
FIG. 3 is a schematic drawing of the floor plan of the upper level of the preferred embodiment of the invention.

Upper level 20, the schematic floor plan of which is shwon in FIG. 3, may be the most valuable teaching tool within trailer 10. Upper level 20 includes two simulated bedrooms, 66 and 68, along with operating windows 56 and 58. Balcony 70 with safety rail 72 is also on upper level 20.

Stairs 74 connect upper level 20 with lower level 18 and permit valuable instruction on the proper method of going down stairs in emergency situations, including when smoke is present.

Smoke generator 76, located in under-stair storage area 78 is used to create a realistic smoke situation with non-toxic smoke, and operating smoke detectors 80 further add to the realism and permit instruction on proper maintenance of such devices. Recessed sprinkler heads 82 do not actually operate, but can be used for instruction in regard to their function.

The safety of the children during instruction, and particularly when they are practicing escape methods while non-toxic smoke is present, is a primary concern in the construction of trailer 10. Structurally, the trailer is built so that its floors, on both levels, can hold all anticipated loads, even those from adults. Also, the glass in all the windows, both exterior and interior windows, is safety glass, so that even in a poor visibility smoke situation, no glass can be broken. Furthermore, because of the location of interior window 84 above stairs 74, interior window 86 inboard of control room 28, and the window in interior door 88 to the control room, the control room operator has a clear view of the entire interior of structure 12 at all times. The operator therefore can always render assistance to the occupants of the trailer.

Also, smoke detectors 80 and fire extinguisher 90 are operating units, so that they may be used, not only for instruction, but also for actual fire protection.

The present invention therefore furnishes a superior teaching tool for instructing children in fire safety and home escape techniques, and also does so with ultimate safety and in a manner which is most likely to be associated with a child's real world.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For instance, rooms can be rearranged or omitted, and other accessories can be included, such as alarm pull boxes for instructing children on their use when they are available.

What is claimed as new and for which Letters patent of the United States are desired to be secured is:

1. A fire safety training apparatus comprising:
    a wheeled trailer;
    a structure mounted on the trailer and permanently attached to the trailer, the structure including exterior walls which define an interior of the structure, interior partitioning walls and portions which are constructed as two levels, with an upper level above a lower level, with the upper level being accessible from within the structure;

stairs accessible from both levels and interconnecting the upper and lower levels; and at least one operating window in an exterior wall of the structure, the window being of a type which is in use in permanent residential structures;

wherein the lower level includes a control room within the interior of the structure and a door in an interior partitioning wall of the structure which directly interconnects the control room with another portion of the interior of the structure; and further including an interior window provides visibility between the control room and other portions of the interior of the structure.

2. The apparatus of claim 1 wherien at least one window in an exterior wall of the structure is of the vertical sliding sash type and at least one other window in an exterior wall of the structure is of the crank operated type.

3. The apparatus of claim 1 further including a smoke generator located on the apparatus and capable of dispensing non-toxic smoke into the structure.

4. The apparatus of claim 1 further including operating smoke detector means within the structure with the smoke detector means activated by the presence of non-toxic smoke generated within the structure.

5. The apparatus of claim 1 further including at least one door in an exterior wall of the structure, the door being of a type which is in use in permanent residential structures.

6. A fire safety training apparatus comprising:

a wheeled trailer;

a structure mounted on the trailer and permanently attached to the trailer, the structure including exterior walls which define an interior of the structure, interior partitioning walls and portions which are constructed as two levels, with an upper level above a lower level, with the upper level being accessible from within the structure;

stairs accessible from both levels and interconnecting the upper and lower levels; and at least one operating window in an exterior wall of the structure, the window being of a type which is in use in permanent residential structures; and further including an exterior balcony located on the upper level.

* * * * *